United States Patent [19]

Nuwayser

[11] 4,214,321
[45] Jul. 29, 1980

[54] GLOVE FOR USE WITH ORGANIC SOLVENTS

[75] Inventor: Elie S. Nuwayser, Wellesley, Mass.
[73] Assignee: Abcor, Inc., Wilmington, Mass.
[21] Appl. No.: 971,800
[22] Filed: Dec. 21, 1978
[51] Int. Cl.² .................... B32B 27/06; A41D 19/00
[52] U.S. Cl. .................................... 2/167; 2/159; 2/161 R; 156/251; 428/421; 428/458; 428/461; 428/480
[58] Field of Search .............. 428/421, 35, 461, 458, 428/500, 516, 480, 215, 906; 2/159, 161 R, 167; 156/251

[56] References Cited

U.S. PATENT DOCUMENTS

| | | | |
|---|---|---|---|
| 3,626,517 | 12/1971 | Kurtz | 428/421 |
| 4,092,452 | 5/1978 | Hori et al. | 428/463 |
| 4,096,309 | 6/1978 | Stillman | 428/461 |
| 4,143,790 | 3/1979 | Ueno et al. | 428/35 |

*Primary Examiner*—George F. Lesmes
*Assistant Examiner*—E. Rollins Buffalow
*Attorney, Agent, or Firm*—Richard P. Crowley

[57] ABSTRACT

A glove adapted for use with organic solvents and other chemicals, which glove is composed of a flexible multilaminate sheet material in glove form, wherein the sheet material is composed of: an outer abrasion-resistant polymer layer, an integral essentially pin-hole-free aluminum-foil material, and an inner heat-sealable thermoplastic polymer material, the multilaminate sheet material heat-sealed along the peripheral edges of the glove formed by the inner thermoplastic polymer layer to the opposite inner thermoplastic layer.

5 Claims, 1 Drawing Figure

U.S. Patent        Jul. 29, 1980        4,214,321
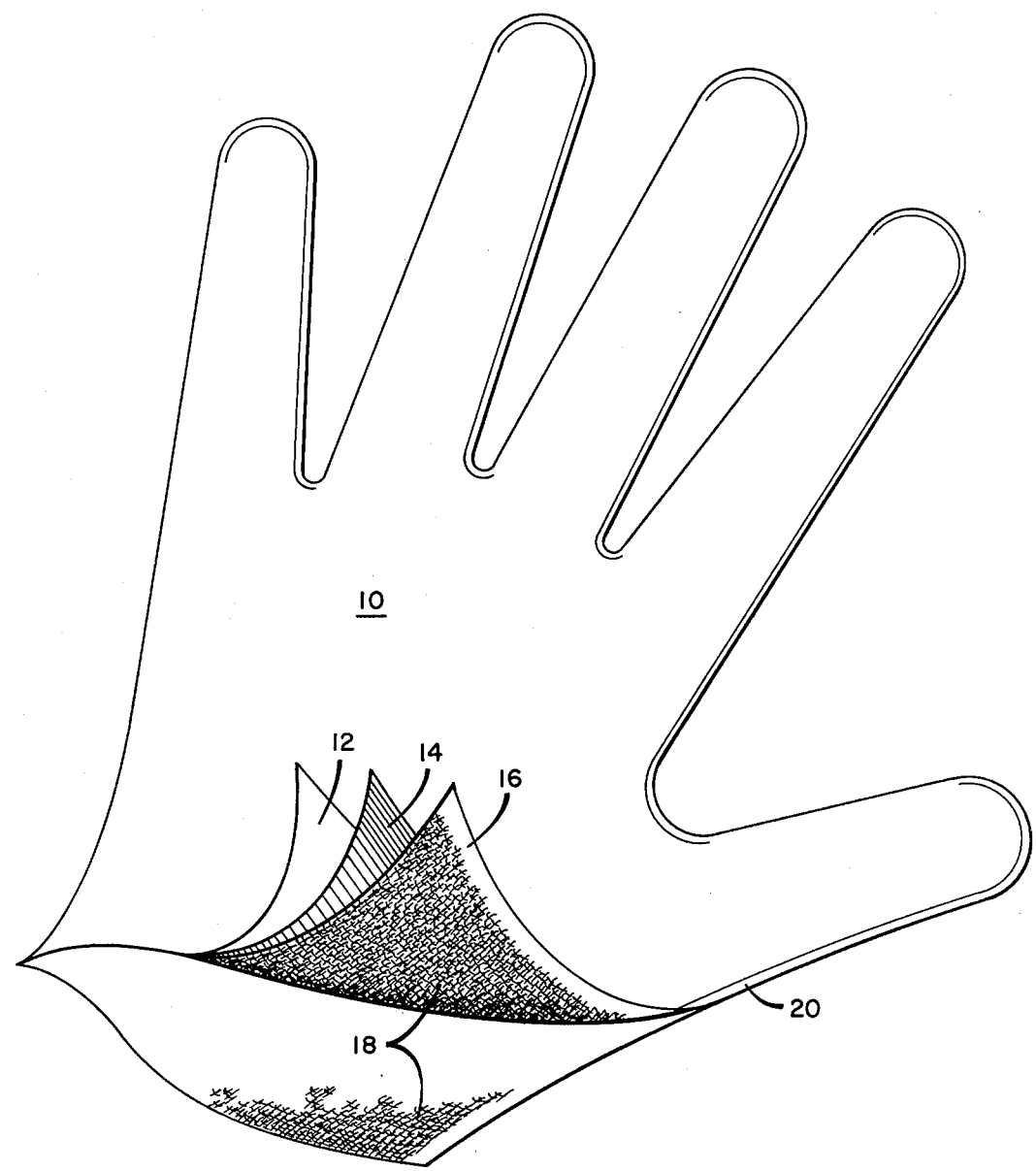

GLOVE FOR USE WITH ORGANIC SOLVENTS

BACKGROUND OF THE INVENTION

Continuous exposure to chemicals, such as organic solvents, for long periods of time, even when the organic solvents are present in relatively small amounts in vapor or liquid form, may cause various skin rashes, allergic reactions and possible damage to internal body organs, such as the liver. It is also known that short exposure to highly toxic chemicals may cause acute skin reactions. Therefore, there exists a need to eliminate direct skin contact with chemical solutions, chemical liquids, solvents and reagents, as well as the vapors from solvents, of chemical-processing and laboratory personnel who may come into direct contact with such chemicals. Typically containers of organic solvents are handled by workers employing gloves. However, often gloves do not provide sufficient protection for such workers, since the materials of which the gloves are composed, such as of plastic or of cloth, are permeable to the organic vapors of such chemicals. It is, therefore, most desirable to provide for a glove which may be employed in the use of handlling highly volatile, organic liquids and other chemicals, but particularly organic solvents, such as tetrahydrofuran, dimethylformamide, benzene and other materials which are desired to be kept from direct contact with the skin of the workers or where the skin of the workers should be shielded from contact with any volatile vapors from such materials.

SUMMARY OF THE INVENTION

My invention is directed to an improved glove for use in handling chemicals where it is desired to avoid direct skin contact with such chemicals or the vapors of such chemicals and to the method of fabricating such a glove. More particularly, my invention relates to a glove fabricated from and composed of a multilayered, laminate, heat-sealable sheet material suitable for use in preventing the contact of volatile organic vapors with the hands of the workers employing such gloves and to a method of fabricating such gloves.

My invention relates to a glove which is highly impermeable to a large number of chemical liquids and chemical solutions and particularly to a number of common organic solvents and to the vapors of such solvents, such as tetrahydrofuran, dimethylformamide, benzene and the like. My glove is fabricated from a multilayered laminate material which provides for an abrasion-resistant outer polymeric layer and an inner heat-sealable polymeric layer and at least one intervening layer of extruded or rolled aluminum film.

It is recognized that many organic polymers have been used in the past in fabricating chemical-resistant gloves. Such polymers have included, but are not limited to: rubber, neoprene, polyvinylchloride, polyvinyl alcohol, polyethylene and other polymers. Each of these polymers is known to be impermeable in various degrees to specific chemical solvents, reagents, acids, alkalis and the like. However and importantly, none of these polymers is impermeable to all chemicals to the same degree, and only a very few polymers are completely impermeable to certain types of chemicals. Thus, gloves employing such materials, alone or in multilayered combinations, are not satisfactory, since such gloves often are permeable to other common organic chemicals and to the vapors of such chemicals.

I have found that an improved glove, suitable for use in protecting workers from a large number of chemicals and vapors, is prepared by fabricating a glove from a flexible aluminum film or aluminum alloy which is laminated on each side with suitable polymers. Aluminum-layer, multipolymeric laminate materials used in fabricating my glove provide for significantly improved protection for the hands of the user, particularly against the hydrocarbon-type solvents, such as tetrahydrofuran, dimethylformamide, benzene and other solvents which tend to attack or to permeate through gloves composed entirely of various polymers.

My multilaminate improved glove is composed of at least three laminate layers. The outer layer comprises an abrasion-resistant outer polymer layer. Typical and suitable polymers for the outer abrasion-resistant layer would comprise polyester resins or fluorocarbon resins, such as polytetrafluoroethylene, or other polymers which provide for good wear and surface-abrasion resistance, so that the polymer layer would not be abraded and worn readily during use. The abrasion-resistant polymer also should be, if possible, a polymer which has good chemical resistance to the solvents with which the outer layer of the glove may come in contact. Therefore, a flexible polyester resin or a fluorocarbon-resin outer polymer layer is preferred. Thus, the outer polymer layer is one which improves abrasion and wear resistance, wet and dry grip and provides resistance to cuts, snags and punctures to the underlying aluminum foil layer. Typically the outer layer of my glove would have a thickness ranging from ½ mil to 5 mils; for example, 1 to 3 mils.

My multilayered glove must contain a flexible metal-foil material which is impervious to the particular chemical and chemical vapor to which the user of the glove is to be or must be exposed in use and preferably comprises a flexible aluminum or aluminum alloy, integral-film or foil material in the multilaminate structure of the glove. In its simplest embodiment, my multilayered glove would comprise at least one aluminum-foil layer and may, if desired, contain two or even three or more layers, as required. The aluminum film employed must be free of pin holes or leaks which permit the passage of the chemicals or chemical vapors and must be thin enough to provide a certain degree of flexibility for use in a glove. The use of aluminum foil does not allow the passage of most organic solvents, such as those previously cited, and aluminum is mot acceptable in terms of pliability, flexibility, availability and cost over other metals. The preferred aluminum foil is an integral extruded or rolled aluminum foil or film in a thickness of at least about 1 mil thickness and preferably 1 ½ thickness minimum to 3 mils thickness.

I have found that aluminum film formed by surface deposit or vacuum-forming techniques under present techniques is not suitable for use in my multilayered gloves, due to the large number of pin holes in such vacuum-deposited-type film. Therefore, the aluminum foil used must be of the extruded rolled or sheet-laminate aluminum foil directly prepared from aluminum metal or an aluminum alloy. The particular aluminum foil or aluminum alloy selected should be one where the aluminum will provide satisfactory fatigue or, where fatigue life is not important, any aluminum extruded or rolled film may be employed, such as in the use of disposable gloves. Therefore, in the preferred embodiment, one or more layers of an extruded aluminum sheet or sheet-type laminate aluminum or aluminum alloy are employed which are essentially free of pin holes and which have a thickness of at least about 1 mil, for example, 1.5 mils. The aluminum foil is laminated on each side with a suitable polymer, such as a heat-sealable thermoplastic polymer on each side, or a heat-sealable polymer on one side and the abrasion-resistant outer layer polymer on the other side.

The inner polymer layer of my improved glove is composed of a heat-sealable polymeric material, such as, for example, a thermoplastic polymer, such as polyethylene or polypropylene resin or blends thereof. The heat-sealable inner polymer layer facilitates rapid and easy fabrication of my improved glove. My improved glove may be fabricated by cutting a laminate material in the shape of a hand of a glove-like shape, leaving a minimum seam around the fingers on the outside contour of the glove shape, and, thereafter, heat-sealing the overlapping material around the outer peripheral edges by the application of heat and pressure to the glove to form an inexpensive and improved glove of my invention.

My multilayered improved glove, therefore, provides for an abrasion-resistant outer layer which permits for use of the glove in its normal use, a heat-sealing inner layer to provide for rapid fabrication of the glove and one or more aluminum-foil layers within the laminations to provide an impermeable barrier to most organic liquids and vapors. The thickness of the inner heat-sealable layer may vary as required, but typically may range from about 1 to 5 mils. In its simplest embodiment, my glove would be composed of a multilaminate layer comprising an abrasion-resistant layer laminated to an integral aluminum foil which has, on the opposite side, a thermoplastic heat-sealable polymer layer laminated thereto; that is, an inner polyethylene-resin layer, extruded aluminum foil and a tough polyester-resin outer layer.

In another embodiment, my glove may be composed of an inner polyethylene layer, an aluminum foil layer, a polyethylene layer, an aluminum foil layer and an outer polyester-resin layer. If desired, for comfort and convenience, an inner fabric layer, such as of cotton, may be employed. The cotton or fabric-support layer should be thin enough, for example, 0.5 to 3 mils, and/or impregnated with a polymer with a thermoplastic polymer to permit sealing of the thermoplastic polymer with the fabric layer in the heat-sealing operation.

My improved gloves are easily fabricated by forming, such as by cutting, a multilayered, laminate, flexible, flat sheet material into two hand-like or shaped forms of the desired size and then superimposing the flat form on each other with the peripheral edge of the forms aligned. The layered sheet material is then heat sealed by the application of heat and typically pressure from a die only along the edge of the forms, for example, 1/16 to ¼ inch, to form a sealed edge by the melting and then cooling together of the two inner polymer layers of the forms, whereby a glove is prepared. Where an inner-support fabric layer is used for the comfort of the glove user or as support for the inner polymer layer, the heat-sealing operation should join the fabric in a sealed edge. Thus, the fabric layer should be thin enough to permit the sealable flow of the inner polymer or be impregnated at its edges with a heat-sealable polymer.

My improved glove will be described in connection with a particular preferred embodiment; however, it is recognized that various changes and modifications may be made, all without departing from the spirit and scope of my invention.

BRIEF DESCRIPTION OF THE DRAWINGS

The FIGURE is a perspective view of my improved glove, showing a partial cross-sectional view of the multilaminate material of the glove.

DESCRIPTION OF THE PREFERRED EMBODIMENTS

With reference to the drawing, there is shown an improved glove 10 of my invention which comprises a three-layered, multilaminate material of an outer abrasion-resistant, plasticized, polyester-resin layer, such as Mylar, a Trademark of DuPont Co., an intervening, integral sheet aluminum-foil layer 14 laminated to the outer layer 12 and an inner heat-sealable polymer layer 16, such as a polyethylene resin, laminated to the opposite side of the aluminum-foil layer 14. The inner heat-sealable polymer layer includes a cotton fabric supporting base 18. The multilaminate material is joined together at the peripheral edges of the glove through the heat-sealing operation to form a heat-sealed edge 20, as illustrated.

My glove, as shown and described, provides for a glove useful as being impermeable to a wide range of chemical solutions, and particularly organic solvents and vapors.

What I claim is:

1. A glove adapted for use with organic solvents and other chemicals, which glove is composed of a flexible multilaminate sheet material in glove form, wherein the sheet material comprises a multilaminate sheet material consisting essentially of:
   (a) an outer, flexible, solvent resistant abrasion-resistant polymer layer comprising a fluorocarbon resin or a plasticized polyester resin;
   (b) an integral essentially pin-hole-free, extruded or rolled, aluminum-foil, flexible material having a thickness of at least about 0.5 to 3 mils; and
   (c) an inner heat-sealable thermoplastic polymer material comprising a polyethylene or polypropylene resin, the multilaminate sheet material heat-sealed along the peripheral edges of the glove form by the inner thermoplastic polymer layer to the opposite inner thermoplastic layer.

2. The glove of claim 1 wherein the sheet material contains at least two layers of aluminum foil, with the layers of the aluminum foil separated by a laminated thermoplastic polymer layer.

3. The glove of claim 1 wherein the outer abrasion-resistant polymer layer is a plasticized polyester-resin layer of from 0.5 to 3 mils in thickness, and the inner heat-sealable thermoplastic polymer layer having a thickness of from about 0.5 to 3 mils.

4. The glove of claim 1 wherein the inner thermoplastic polymer material is supported on an inner thin-fabric layer and wherein the peripheral edge of the glove is heat sealed through the fabric layer.

5. A method of fabricating an improved glove for handling organic solvents, which method consists essentially of:
   (a) forming a multilayer, laminate, flexible, flat sheet material into two hand-like forms and superimposing such flat forms over each other, the sheet material composed of:

(i) an outer, flexible, solvent-resistant, abrasion-resistant polymer layer;
(ii) an integral essentially pin-hole-free, extruded or rolled, aluminum-foil, flexible material having a thickness of at least about 0.5 mil; and
(iii) an inner heat-sealable thermoplastic polymer material, the multilaminate sheet material heat-sealed along the peripheral edges of the glove form by the inner thermoplastic polymer layer to the opposite inner thermoplastic layer; and (b) heat sealing the adjoining peripheral edge of the two hand-shaped forms together by the application of heat and pressure to form a sealed, heated peripheral edge by the melting of the inner polymer layer of each form.

* * * * *